United States Patent [19]
Mendez et al.

[11] Patent Number: 5,463,374
[45] Date of Patent: Oct. 31, 1995

[54] METHOD AND APPARATUS FOR TIRE PRESSURE MONITORING AND FOR SHARED KEYLESS ENTRY CONTROL

[75] Inventors: Victor Mendez; Kevin J. Hawes, both of Kokomo, Ind.

[73] Assignee: Delco Electronics Corporation, Kokomo, Ind.

[21] Appl. No.: 208,322

[22] Filed: Mar. 10, 1994

[51] Int. Cl.⁶ .................................................. B60C 23/00
[52] U.S. Cl. .................... 340/442; 340/539; 340/444; 340/445; 340/447; 73/146.3
[58] Field of Search ................................ 340/517, 521, 340/539, 444, 445, 447; 73/146.3

[56] References Cited

U.S. PATENT DOCUMENTS

| | | | |
|---|---|---|---|
| 4,163,208 | 7/1979 | Merz | 340/447 |
| 5,109,213 | 4/1992 | Williams | 340/447 |
| 5,285,189 | 2/1994 | Nowicki et al. | 340/447 |
| 5,289,369 | 2/1994 | Hirshberg | 364/401 |

OTHER PUBLICATIONS

Popular Mechanics–Mar. 1973, vol 139 No. 3–P. 129.

*Primary Examiner*—John K. Peng
*Assistant Examiner*—Daryl C. Pope
*Attorney, Agent, or Firm*—Mark A. Navarre

[57] ABSTRACT

Vehicle tires each contain a sender including a microprocessor, a radio transmitter, a pressure detector and a magnetic switch for sending a radio signals indicating sender ID, pressure data and change of switch state. An on-board receiver unit having a microprocessor evaluates the transmitted data and displays pressure condition information. A portable magnet is placed near each tire, in turn, to operate the magnetic switches, resulting in a sequential transmission of sender ID codes which allows the receiver unit to learn the tire position of each sender. An inertia switch in the tire triggers a radio transmission and the receiver unit considers the absence of a transmission when expected as a failure and displays a service needed message. A remote portable sender transmits signals for door unlocking or locking, trunk opening and interior light control. The receiver unit responds to the signals and issues commands to appropriate actuators.

7 Claims, 5 Drawing Sheets

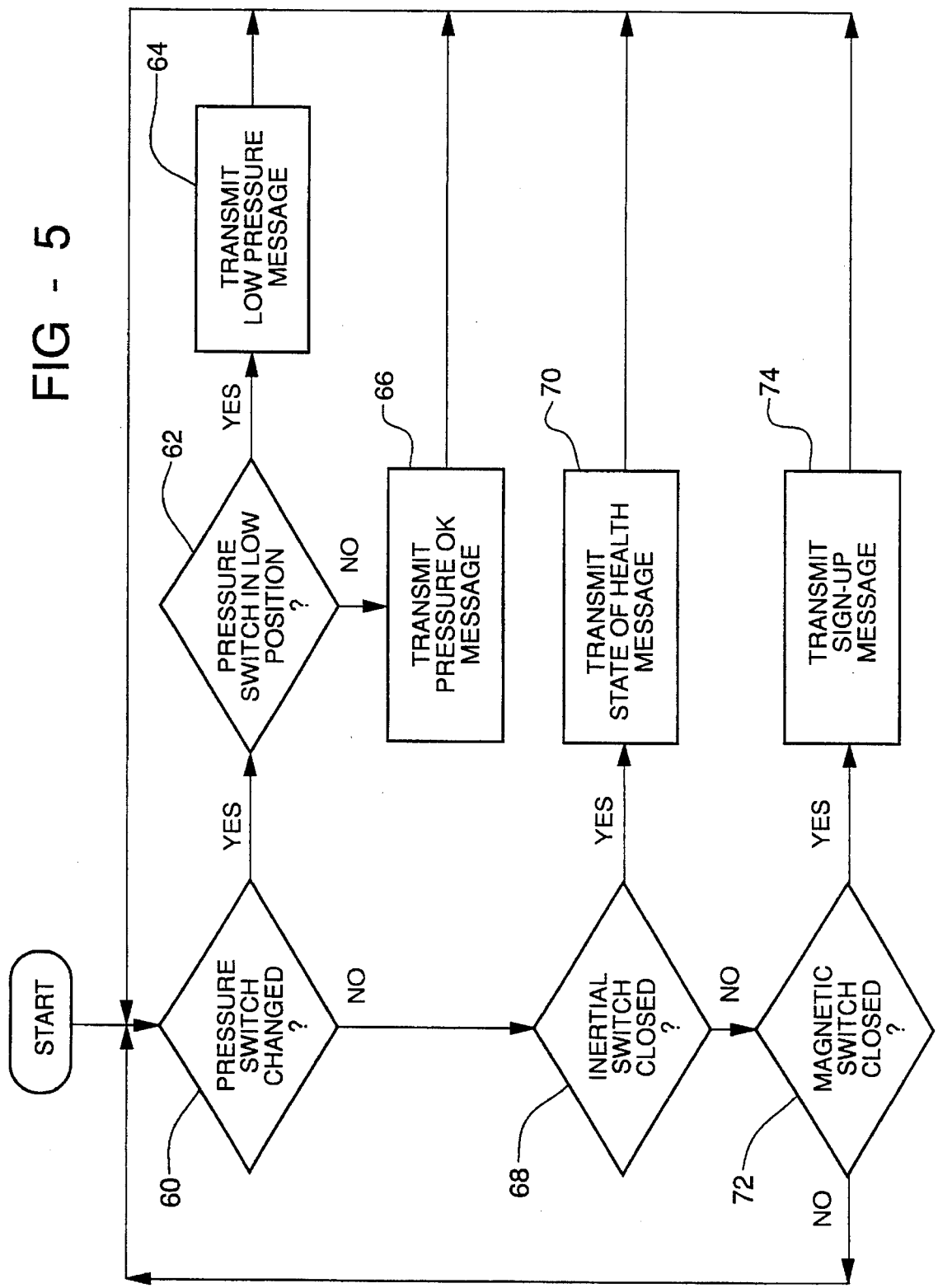

METHOD AND APPARATUS FOR TIRE PRESSURE MONITORING AND FOR SHARED KEYLESS ENTRY CONTROL

FIELD OF THE INVENTION

This invention relates to a method and apparatus for detecting vehicle tire pressure using facilities shared with another vehicle function and particularly to a method and system for tire pressure monitoring and keyless entry control using common hardware.

BACKGROUND OF THE INVENTION

It has previously been proposed to monitor tire pressure by a transducer within each vehicle tire. Several schemes have been tried for advising the vehicle operator of tire pressure conditions, especially in the case of low tire pressure. It is known, for example, to generate a visible signal at the tire and to visually inspect the signal. It is also known to generate a magnetic field at the transducer in response to a low pressure condition, to detect the field by a detector mounted near each wheel, and to display a warning on the instrument panel. It has also been proposed to mount a transducer and radio transmitter within each tire and a receiver on the vehicle dedicated to processing transmitted tire pressure data and displaying necessary information.

For the radio transmission type of pressure data communication it is desirable that rather than requiring a dedicated stand-alone receiver and processor unit, that this function be coordinated with another vehicle function to reduce system expense as well as power drain on the vehicle battery.

Regarding the transmitter side of a radio transmission system, the energy for supplying the transmitter may be generated by tire rotation, in which case information on a low tire pressure condition occurring when the vehicle is not in use cannot be displayed until after vehicle movement begins. Alternatively, the energy may be supplied by a battery, but then considerations of battery life come into play. It is desirable that battery life be very long, perhaps as long as vehicle life, while not compromising the amount or frequency of tire condition information delivered by the system. It is desirable to know, in addition to low pressure condition, when correct pressure is restored, which tire is affected, and the operability of the transmitter units.

SUMMARY OF THE INVENTION

A principal object of the invention is to share receiver and processor tasks with another vehicle function to minimize system expense. It is another principal object of the invention to display tire pressure information specific to each tire position and to update position data when tires are installed and rotated. Another object is to make the tire pressure condition information available upon vehicle start-up and before vehicle movement. Still another object is to optimize the availability of information on tire pressure and the condition of transmitter units while minimizing power consumption.

The invention comprises two major aspects: sharing the receiver function with another vehicle operation to economize on initial expense as well as upon power requirements; and assigning an identification code to each transmitter, establishing a record of the tire position of each transmitter and updating the record when tires are rotated, so that pressure data can be related to a specific tire position.

An automobile is equipped with a radio receiver for receiving transmissions from remote senders serving a keyless entry function as well as a tire pressure monitoring function, and a processor (microprocessor) associated with the receiver for decoding received signals and carrying out appropriate responses in the vehicle. The keyless entry senders are miniature controls carried in the pocket or purse of a user for transmitting radio signals to the vehicle to effect door unlocking, trunk opening, and interior illumination. The tire pressure senders are controls mounted within a tire for sensing tire pressure condition for transmitting to the vehicle receiver information on pressure, the identification code of each sender and the condition of the sender itself. The signal format of the tire pressure senders is the same as the keyless entry senders. A code in the signal identifies the source of the signal, and the processor handles the signal data accordingly. For the keyless entry function the processor is linked to door lock circuits, interior lighting circuits and to a trunk opener for selectively responding to radio transmitted signals from the entry senders. For the tire pressure monitor function the processor controls an instrument panel display which shows tire pressure messages visible to the vehicle operator.

In the case of the tire pressure senders, a pressure switch, a magnetic switch, an inertia switch and optionally an analog pressure sensor are inputs to a controller which drives a transmitter, all being powered by a long-life battery. To minimize energy consumption the transmitter is turned off and the controller remains in a sleep mode until a sensed event calls for transmission of data. When the tire pressure drops below the pressure switch setting or increases above the setting, that event wakes up the controller and the new pressure status is transmitted to the receiver. Occasionally a state of health signal is sent to the receiver just to verify that the controller and transmitter are operational. This signal can be triggered periodically by a timer in the controller, but preferably the inertia switch is used to trigger the signal whenever the vehicle speed reaches some vehicle speed such as 25 mph. If it is desired to report the tire pressure value to the operator, the optional analog sensor is coupled to the controller and is empowered by the controller whenever the inertia switch operates so that a pressure value is determined and transmitted to the receiver along with the state of health signal. Every data transmission includes an identification code peculiar to the sending controller so that the receiver processor can relate the information to a particular tire.

The magnet switches are used to teach the receiver processor the location of each tire on the vehicle, including the spare tire. A magnetic switch may, for example, be a reed switch which changes state when affected by a magnetic field. A portable magnet is carried by an operator and placed adjacent each tire in a predetermined sequence. As each switch opens or closes it wakes up its associated controller to transmit the identification code to the receiver. The processor then is apprised of the location of each of the tires and makes a record of that information. Then each time a low pressure or other signal is received from a tire pressure sender the processor can identify the tire position where the data originated. When tires are rotated to different wheel positions the teaching process is repeated to update the tire position record.

BRIEF DESCRIPTION OF THE DRAWINGS

The above and other advantages of the invention will become more apparent from the following description taken in conjunction with the accompanying drawings wherein like references refer to like parts and wherein:

FIG. 5 is a flow chart showing the operation of a tire pressure sender, according to the invention.

DESCRIPTION OF THE INVENTION

The ensuing description is directed to a system developed to combine a tire pressure warning function and a keyless entry function using a common receiver and processor on the vehicle for implementing commands and displaying information in the vehicle. It should be understood, however, that the invention may be implemented with other functions instead of or in addition to the keyless entry function sharing the receiver and processor for managing data originating either on board the vehicle or remote from the vehicle.

Figures 1, 4:
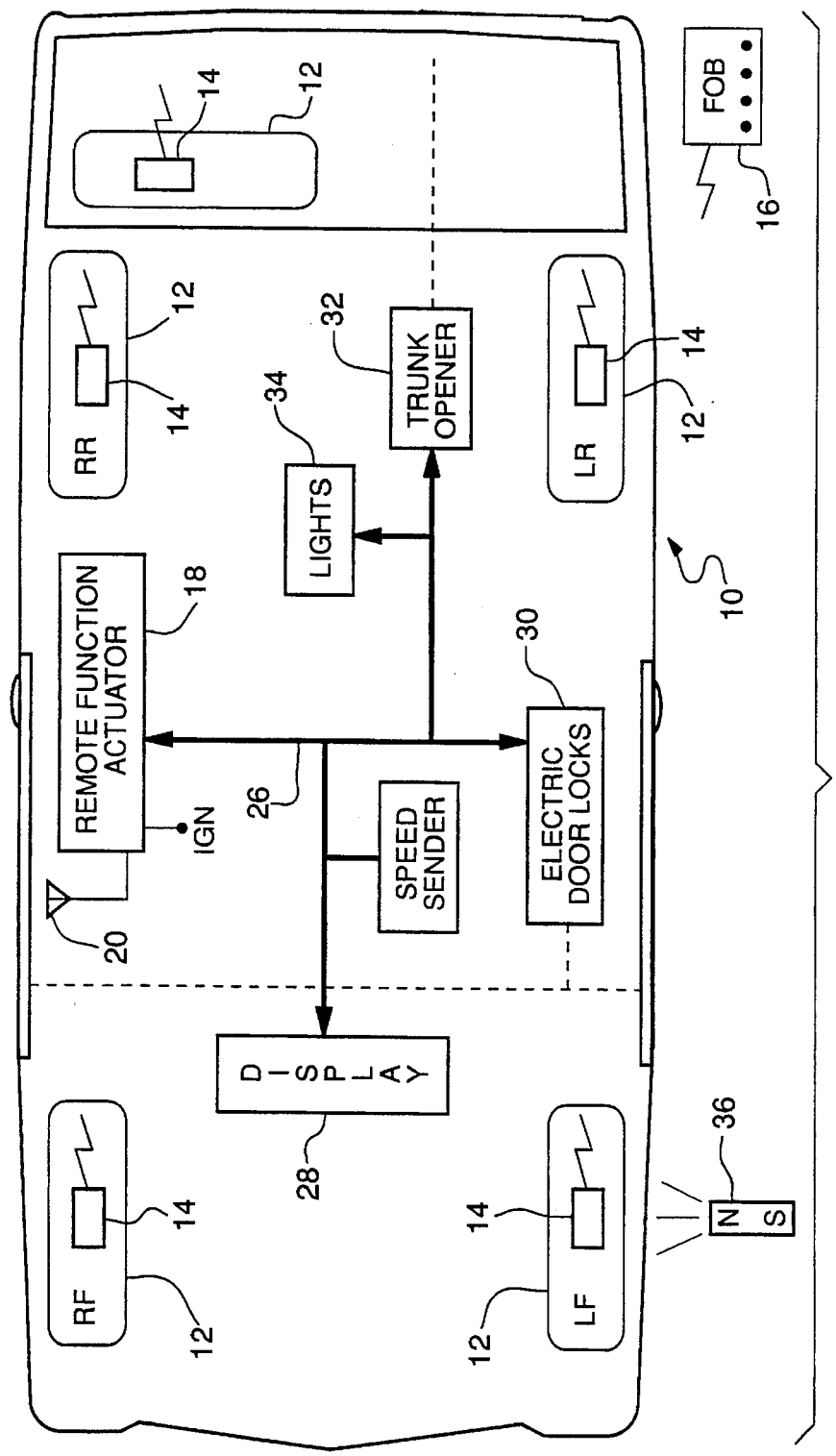
FIG. 1 is a schematic diagram of a keyless entry and tire pressure warning system according to the invention.
FIG. 4 is an illustration depicting the data format of radio communication used in the system.
Figure 2:
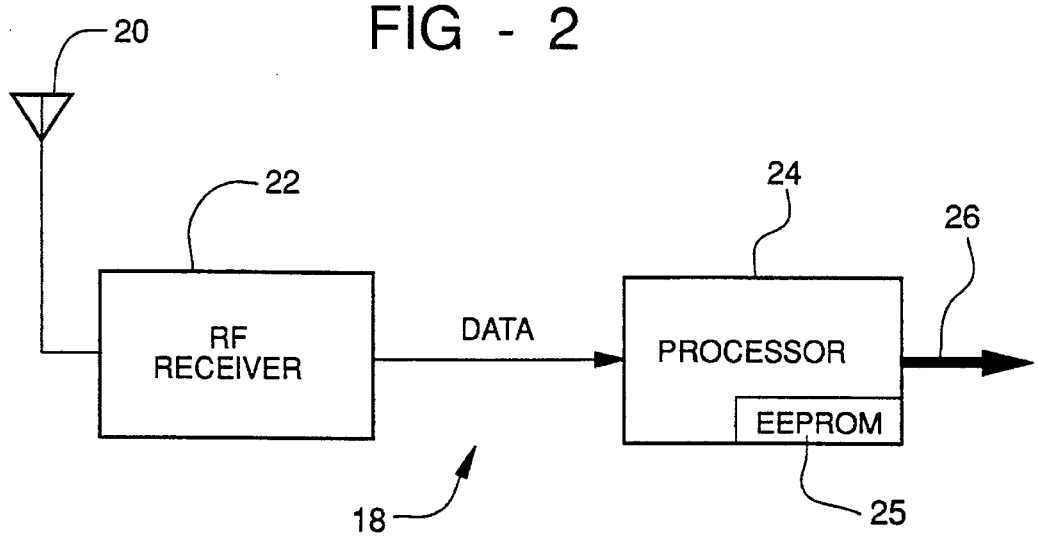
FIG. 2 is a schematic diagram of a remote function actuator of FIG. 1.

Referring to FIG. 1, an automotive vehicle 10 has five tires 12 at left front (LF), right front (RF), right rear (RR), and left rear (LR) positions and a spare tire in the vehicle trunk. Each tire is equipped with a tire pressure sender 14 residing within the tire and subject to tire pressure for transmitting radio signals carrying pressure related information. Each sender 14 has a unique identification code which is included in every transmission to help locate the source of pressure information. A portable remote keyless entry control or fob 16 small enough to be easily carried on the person of a vehicle operator transmits radio signals containing commands for unlocking doors, opening the trunk or turning on the vehicle lights. A remote function actuator 18 carried on board the vehicle includes an antenna 20 for receiving the signals transmitted by the tire pressure sender 14 and the fob 16. FIG. 2 illustrates the actuator 18 as a radio frequency receiver 22 coupled to the antenna 20 and to a processor 24 which has a non-volatile memory such as an EEPROM 25. The processor is a microprocessor having a receiver-on port for sending a command to the receiver and a data port for accepting data from the receiver 22. The processor output is connected to a class 2 bus 26 which communicates with a vehicle display 28, electric door locks 30, a trunk opener 32, and interior vehicle lights 34. A portable permanent magnet 36 is provided for use by the vehicle operator or service personnel for programming or teaching the actuator processor 24 the tire positions occupied by the respective tire pressure senders 14.

Figure 3:
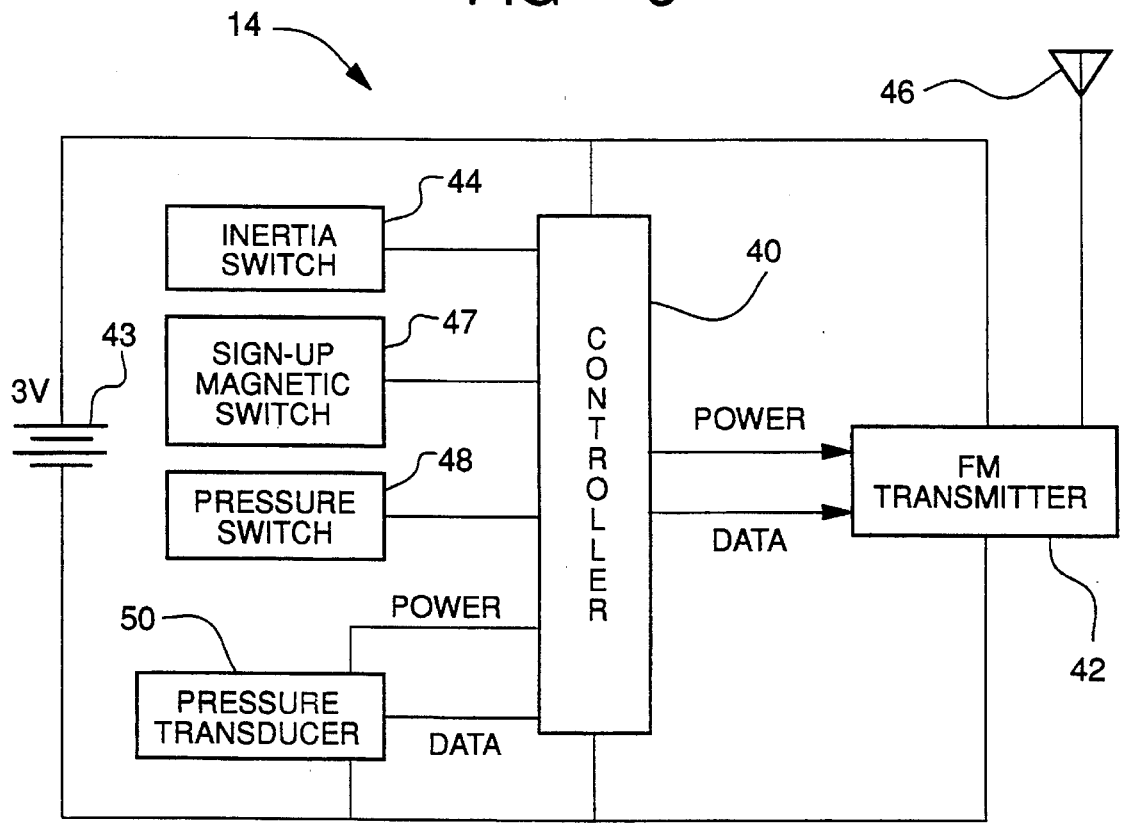
FIG. 3 is a schematic diagram of a tire pressure sender portion of the system of FIG. 1.

The tire pressure sender 14, best shown in FIG. 3, has a controller 40 and an FM transmitter 42, each powered by a battery 43, and a transmitter antenna 46. The controller comprises a microprocessor configured to maintain a sleep state requiring very low power consumption until it is awakened by some external event. The controller 40 has a data output coupled to the transmitter 42 for defining the transmitted signal, and a power output to the transmitter for turning on the transmitter only when a transmission is required, thus further saving battery energy. Inputs to the controller 40 are an inertia switch 44, a sign-up magnetic switch 47, a pressure switch 48 and optionally, a pressure transducer 50. The latter requires power so that a power line and a data line connect the transducer 50 to the controller 40 to impart analog pressure measurements to the controller when power is furnished to the transducer. The matter of energy usage is important since the sender 14 is not easily accessible for battery replacement and the system should be designed to provide many years of battery life.

The inertia switch 44 is sensitive to tire speed and is actuated when the tire speed reaches a predetermined value which, for example, corresponds to a vehicle speed of 25 mph. The switch actuation prompts the controller to wake up momentarily and send a state of health message via the transmitter, and then return to the sleep state. The processor 24, in turn, notes each state of health message. In the event that a message is not received from each sender when the vehicle speed reaches a higher speed such as 35 mph, the processor displays a message such as "Service Right Front Pressure Sender Soon". Thus each tire pressure sender is occasionally sampled to verify its operability. The analog pressure data from each transducer 50 may be sent and displayed (or stored for later use) at the same time to update that information. Instead of the inertia switch, other means may be used to trigger a health verification. A timer could be operated for that purpose, but at the expense of energy consumption.

The sign-up magnetic switch 47 is operated by placing the magnet 36 near the tire. When a magnetic switch is actuated the controller is awakened and causes a sign-up code as well as the identification code to be sent to the transmitter 42 and then to the actuator 18. By moving the magnet from one tire to another in a prescribed sequence, the resulting sequence of transmissions enables the actuator to determine the position of each sender 14.

The pressure switch 48 is set to change state (open or close) at a suitable warning pressure. As the pressure in a tire drops below the set pressure the switch changes state and the controller is awakened to cause transmission of a low pressure code. When pressure is restored to the tire, the pressure switch reverts to its original state and the controller is awakened to transmit a pressure OK code. The processor 24 responds to the signals by displaying a low pressure or pressure OK message for that tire.

Each time the controller is awakened it produces a short radio transmission and then resumes its sleep state. In the sleep state the controller draws 1 μa but when transmitting the sender requires about 3 ma. The transmitter employs frequency modulation with a carrier frequency of preferably 315 MHz. The data format is pulse width modulated. Both the data format and the message format are compatible with that of the fob 16 so that the receiver can consistently manage the data from either source.

The message format as shown in FIG. 4 comprises a preamble which comprises a series of ones; a header one byte long for message byte forming and identifying the source as a tire sender or a keyless entry fob; the unique transmitter identification code which is four bytes long; pressure data including seven bytes of zeros and 1 byte containing pressure measurements from the transducer 50 covering a range of 0 psi to 100 psi; a function code one byte long to denote sign-up, state of health, pressure low or pressure high, and finally a checksum 1 byte long for message verification. For the fob 16 transmission the function code would contain sign-up, door lock, door unlock, trunk open, or light on commands, and the pressure data is replaced by security data which would comprise a code for verifying authenticity of the sending fob.

The process carried out by the controller is summarized by the flow chart of FIG. 5. In the description of that flow chart and the subsequent flow charts, numerals in angle brackets, <nn>, refer to the function of blocks bearing corresponding reference numerals. According to the controller program, if the pressure switch changes state <60>, and the new state is in the low pressure position <62>, the low pressure message is transmitted <64>. If it is not in the low pressure position, a pressure OK message is transmitted <66>. If the pressure switch has not changed but the inertia switch is closed <68> a state of health message is transmitted <70>. If the inertia switch has not closed and the magnetic switch has closed <72>, a sign-up message is transmitted <74>. After any message transmission or if no switch has closed or changed state, the program returns to Start. It is to be understood that if the sender 14 is equipped with a pressure transducer, the pressure data will be a part of each transmission.

Figure 6:
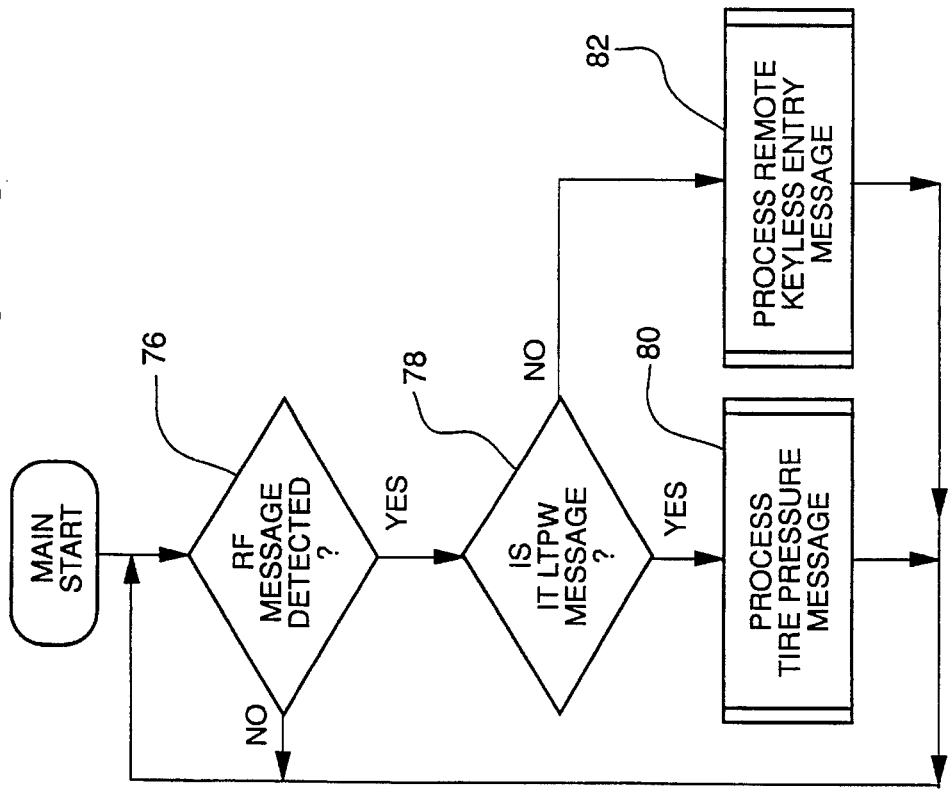

The transmitted data is evaluated by the processor 24. The processor programming is illustrated by the flow charts of FIGS. 6-8. The main processor loop is shown by FIG. 6. Beginning at a Main Start, it determines if a message is detected <76>, and whether it is a tire pressure related message <78>. If it is, a routine is entered for processing tire pressure messages <80>, otherwise a routine is entered for processing keyless entry messages <82>. At the end of either routine the program returns to start.

Response of the processor to signals received from the fob is straight-forward. When the function code commands an action such as Lock Door, Unlock Door, Open Trunk or Turn On Interior Lights, the processor issues a signal on the bus to activate the appropriate utilization circuit.

Figure 7:
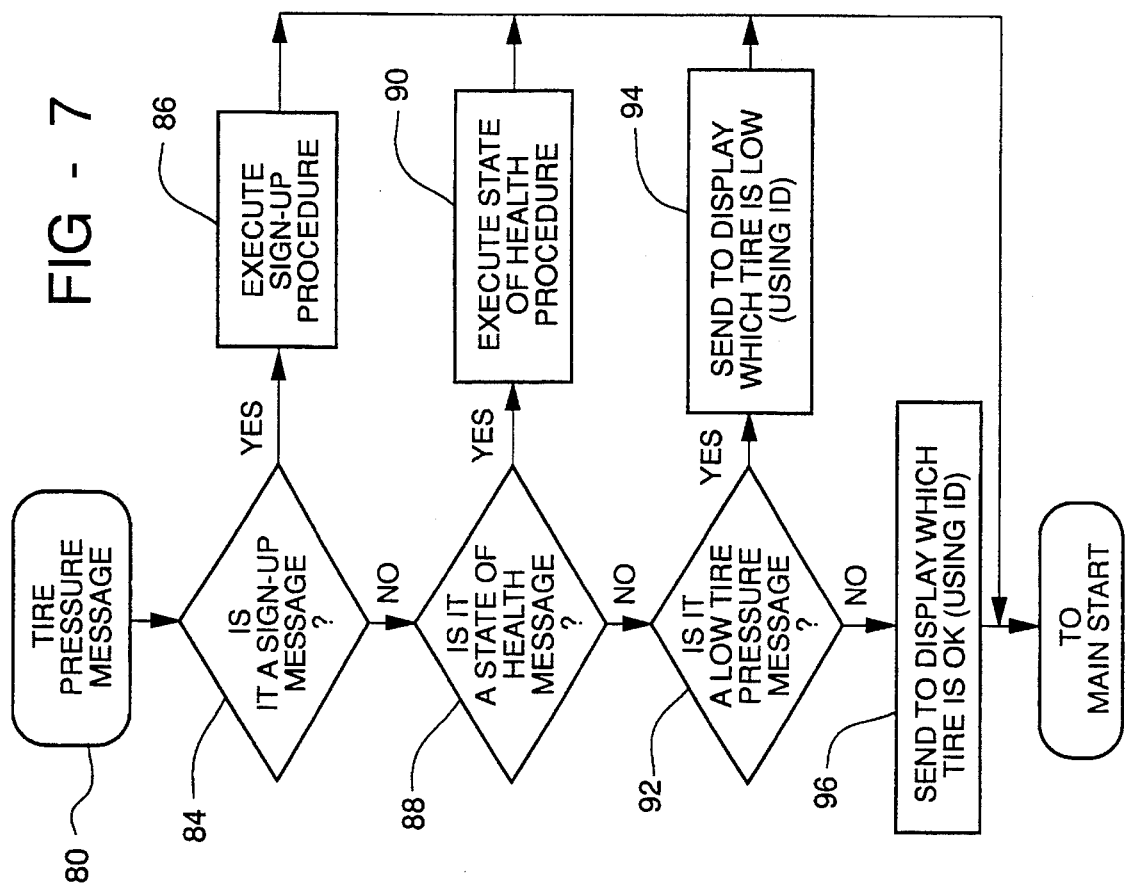
FIGS. 6-8 are flow charts showing the operation of the receiver processor according to the invention.

The routine 80 for processing tire pressure messages is shown in the flow chart of FIG. 7. If the message is a sign-up message <84> a sign-up procedure is executed <86>. If it is a state of health message <88>, a state of health procedure is executed <90>. That procedure counts failures to detect a state of health message and to display a service message if three or four failures are accumulated for a given sender. If it is a low tire pressure message <92> a low pressure warning is shown on the display <94> for the particular tire position which sent the message as determined by the identification code incorporated in the transmission, and a record of sender 14 positions established in the sign-up procedure. Finally, if it is not a low tire message <92> it must then be a pressure OK message from a tire which was previously low, and a tire OK message is displayed for the tire position from which the message originated. The program then returns to the Main Start of FIG. 6. Upon the receipt of a low pressure message or pressure OK message that information and the tire position is stored in the EEPROM 25. If the vehicle is operating when the pressure message is received it is immediately displayed. In the event that the vehicle is not operating when the pressure message is received, the new data is retrieved from the EEPROM and the appropriate message is displayed when the ignition is turned on.

Figure 8:
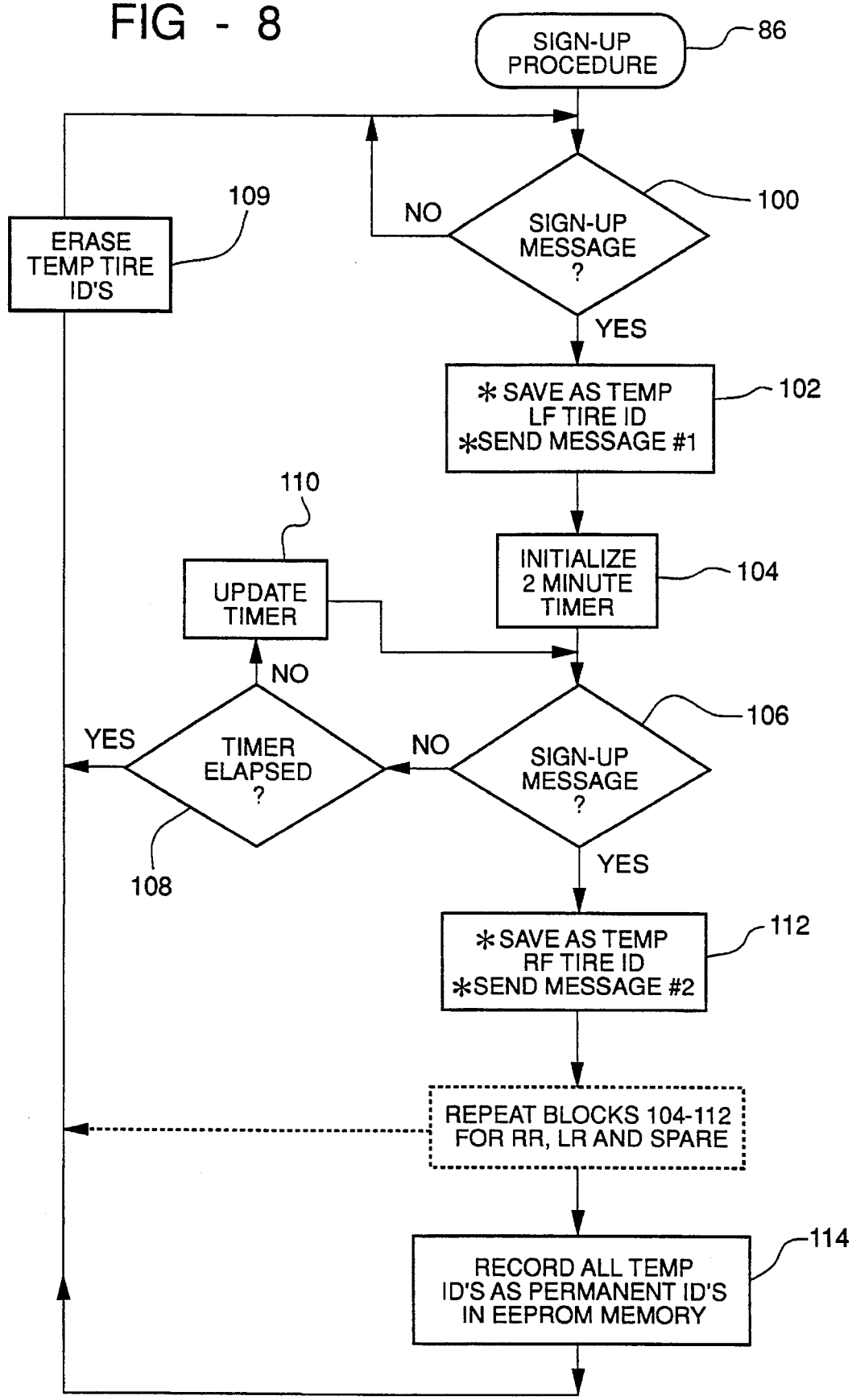

The sign-up procedure 86 is initiated by a person manually moving the magnet to each tire, in turn, according to a prescribed sequence, say, LF, RF, RR, LR, and then Spare. This causes each sender 14 to transmit a sign-up message accompanied by the identification code (ID). A time delay, preferably up to two minutes, is permitted between each measurement to allow movement from tire to tire. This series of sign-up messages provides the processor an opportunity to store the codes and their order of receipt. As shown in FIG. 8, when the first sign-up message is detected <100> the ID is saved as the temporary LF tire ID, and a message is displayed acknowledging the sign-up message <102>. Such a display may read "LF TIRE PROGRAMMED. WAITING FOR RF TIRE", for example. Next a two minute timer is initialized <104>. While waiting for another sign-up message <106> the timer is checked <108>; if the time has elapsed the temporary ID is erased <109> and the routine returns to the beginning, otherwise the timer is updated <110>. When another sign-up message is detected before timeout <106>, the ID is saved as the temporary RF tire ID and the appropriate message is displayed <112>. The process of blocks 104–112 is repeated for tire positions RR, LR, and Spare. If all five temporary IDs are recorded they are then transferred as permanent IDs in EEPROM memory <114>, and the temporary IDs are erased <109>. Thereafter this record is referred to for determining tire position for any received ID. Any time the tire positions are changed for tire rotation or exchanging a tire of the spare, the sign-up procedure must be repeated to update the EEPROM record of tire positions.

It will thus be seen that combining the low tire pressure warning and keyless entry systems to share a receiver affords economy in initial cost and energy use. By using a common communication format the receiving microprocessor can readily process the incoming data from either source. Other vehicle functions using radio frequency data communication can be added to the system or used instead of the keyless entry function. The low tire pressure sender itself is economical in energy usage to afford long battery life. Even so, state of health reports, low tire pressure warning, pressure OK advisories, tire position programming, and analog pressure measurements are provided.

The embodiments of the invention in which an exclusive property or privilege is claimed are defined as follows:

1. A vehicle remote function actuator system having a single on-board radio receiver, comprising at least one remote tire transmitter for transmitting radio frequency tire condition data;

at least one remote vehicle function transmitter for transmitting radio frequency vehicle function data;

a radio receiver mounted on the vehicle for receiving data from said remote tire transmitter and said remote vehicle function transmitter;

a controller having a pressure detector for providing pressure condition data to said remote tire transmitter and causing said remote tire transmitter to transmit the pressure condition data to said receiver;

the remote transmitters all having the same data format but distinctive codes for tire transmitters and vehicle function transmitters;

a processor connected to the receiver and coupled to a display device and to a vehicle function device for responding to the transmitted data; and the processor being programmed to effect display of pressure condition data on said display device when a transmitted data contains a distinctive code for tire transmitters, and to activate said vehicle function device when a transmitted data contains a distinctive code for the vehicle function transmitters.

2. The invention as defined in claim 1 wherein the vehicle includes electric door locks and wherein:

the vehicle function transmitter is a remote keyless entry transmitter for issuing door lock operation commands; and the processor is connected to the electric door locks for lock operation upon receipt of radio frequency vehicle function data from said keyless entry transmitter.

3. A combined keyless entry and low tire pressure warning system for a vehicle having electric door locks and a warning display comprising:

a set of remote transmitters comprising radio frequency tire transmitters one mounted in each tire for transmitting data messages including modulated data and an identification code;

a radio frequency keyless entry transmitter for transmitting lock operation commands;

a radio receiver mounted on the vehicle for receiving data messages from the tire transmitters and lock operation commands from the keyless entry transmitter;

a processor coupled with the receiver, the electric door locks and the warning display for controlling the locks and the display according to transmitted commands and messages;

a controller coupled with each tire transmitter having a pressure detector for providing pressure data to the tire transmitter, an identification code for transmission with the pressure data, and a switch activated by a vehicle user for transmitting a sign-up message including the identification code for that tire location, the receiver unit including means for storing identification codes from the transmitted sign-up messages for comparison with subsequently transmitted data messages to differentiate data transmitted from various tire locations.

4. In an automotive vehicle having a plurality of tires each equipped with a pressure sensor and a pressure data message transmitter, a visible display for pressure condition information, a keyless entry system including door operating apparatus and remote keyless entry command transmitters, and a receiver on the vehicle for receiving messages and commands from the transmitters and a processor coupled to the receiver, the display and the door operating apparatus for interpreting and executing the messages and commands, a method of operation comprising the steps of:

detecting a tire pressure condition in at least one tire and formulating tire pressure data;

transmitting a tire pressure signal including tire pressure data along with a code peculiar to said pressure data message transmitter;

transmitting an entry signal including a door operation command along with a code peculiar to said keyless entry command transmitters;

receiving the tire pressure and entry signals;

determining from the code for each received signal whether such signal contains tire pressure data or a door operation command;

displaying tire pressure information for received signals containing tire pressure data; and executing door operation commands for received signals containing door operation commands.

5. The invention as defined in claim 4 wherein the step of transmitting a tire pressure signal includes:

transmitting a code unique to each tire;

determining from such code which tire position on the vehicle corresponds to the received tire pressure signal; and displaying the determined tire position with the displayed tire pressure information.

6. The invention as defined in claim 5 wherein each tire is equipped with a magnetic switch and a control responsive to switch actuation including the steps of:

manually presenting a magnet to each tire in a prescribed rotation for sequentailly actuating the magnetic switches;

in response to each switch actuation transmitting the code unique to such tire;

receiving the codes transmitted in response to each magnetic switch acuation and storing such codes for comparison with subsequently transmitted tire pressure signals to differentiate pressure data transmitted from various tire location.

7. The invention as defined in claim 6 wherein:

the step of detecting tire pressure includes detecting when tire pressure falls below a fixed value;

the step of transmitting a tire pressure signal includes transmitting a low pressure indication along with a code peculiar to the respective transmitter; and the step of displaying tire pressure information includes displaying a tire pressure warning for the tire position identified with the transmitted code.

* * * * *

UNITED STATES PATENT AND TRADEMARK OFFICE
CERTIFICATE OF CORRECTION

| | | |
|---|---|---|
| PATENT NO. | : 5,463,374 | Page 1 of 1 |
| APPLICATION NO. | : 08/208322 | |
| DATED | : October 31, 1995 | |
| INVENTOR(S) | : Victor Mendez and Kevin J. Hawes | |

It is certified that error appears in the above-identified patent and that said Letters Patent is hereby corrected as shown below:

In the Specification

In column 3 line 7 - replace "data" with --message--.

Signed and Sealed this

Twenty-first Day of July, 2015

Michelle K. Lee
*Director of the United States Patent and Trademark Office*